(12) United States Patent
Li et al.

(10) Patent No.: US 7,300,702 B2
(45) Date of Patent: Nov. 27, 2007

(54) DIFFUSION BARRIER COATING FOR SI-BASED COMPONENTS

(75) Inventors: Chien-Wei Li, Livingston, NJ (US); Derek Raybould, Denville, NJ (US); Thomas E. Strangman, Prescott, AZ (US); Bjoern Schenk, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 496 days.

(21) Appl. No.: 10/644,523

(22) Filed: Aug. 18, 2003

(65) Prior Publication Data

US 2005/0042461 A1 Feb. 24, 2005

(51) Int. Cl.
*B32B 9/00* (2006.01)

(52) U.S. Cl. ..................................... 428/446

(58) Field of Classification Search ............... 428/446; 427/156; 313/268, 348; 439/636; 257/295, 257/310

See application file for complete search history.

(56) References Cited

U.S. PATENT DOCUMENTS

| | | | |
|---|---|---|---|
| 5,499,905 A | | 3/1996 | Schmitz et al. |
| 5,585,136 A | * | 12/1996 | Barrow et al. ............. 427/2.24 |
| 5,736,198 A | | 4/1998 | Yasufomi et al. |
| 6,071,622 A | | 6/2000 | Beesabathina et al. |
| 6,121,133 A | * | 9/2000 | Iyer et al. ................... 438/636 |
| 6,168,875 B1 | | 1/2001 | Cybulsky et al. |
| 6,207,295 B1 | * | 3/2001 | Stowell et al. .............. 428/615 |
| 6,294,807 B1 | * | 9/2001 | Chittipeddi et al. ........ 257/310 |
| 6,306,515 B1 | | 10/2001 | Goedjen et al. |
| 6,312,763 B1 | | 11/2001 | Eaton, Jr. et al. |
| 6,335,105 B1 | | 1/2002 | McKee |
| 6,475,928 B1 | | 11/2002 | Baranguer et al. |

(Continued)

FOREIGN PATENT DOCUMENTS

EP 1 187 191 A2 3/2002

OTHER PUBLICATIONS

PCT International Search Report PCT/US2004/026665, Jul. 26, 2005.

(Continued)

*Primary Examiner*—Jennifer C. McNeil
*Assistant Examiner*—Daniel Miller
(74) *Attorney, Agent, or Firm*—Ingrassia Fisher & Lorenz

(57) ABSTRACT

A component comprising a silicon-based substrate and a diffusion barrier coating disposed on the silicon-based substrate. The diffusion barrier coating comprises an isolation layer disposed directly on the silicon-based substrate and at least one oxygen barrier layer disposed on the isolation layer. The oxygen barrier layer prevents the diffusion of oxygen therethrough, and prevents excessive oxidation of the silicon-based substrate. The isolation layer(s) prevent contaminants and impurities from reacting with the oxygen barrier layer. An environmental barrier coating may be disposed on the diffusion barrier coating, and a thermal barrier coating may be disposed on the environmental barrier coating. Methods for making a component having a diffusion barrier coating are also disclosed.

38 Claims, 6 Drawing Sheets

U.S. PATENT DOCUMENTS

| | | |
|---|---|---|
| 6,517,959 B1 | 2/2003 | Beele |
| 6,558,998 B2 * | 5/2003 | Belleville et al. ............ 438/210 |
| 6,733,908 B1 * | 5/2004 | Lee et al. ................... 428/702 |
| 6,759,151 B1 * | 7/2004 | Lee ........................... 428/701 |
| 2002/0081396 A1 | 6/2002 | Li et al. |
| 2002/0098391 A1 | 7/2002 | Tanaka et al. |
| 2003/0003328 A1 | 1/2003 | Spitsberg et al. |
| 2004/0219295 A1 * | 11/2004 | Perepezko et al. ..... 427/255.27 |

OTHER PUBLICATIONS

Joseph Baixeras, Influence of Rapid Thermal Annealing Parameter On Properties Of YBaCuO Thin Films Sputtered On Silicon-Based Substrates, Spie, High Tc Superconductivity: Thin Films And Applications, 1990, pp. 185-197, Paris, FR. XP-002335434.

* cited by examiner

DIFFUSION BARRIER COATING FOR SI-BASED COMPONENTS

BACKGROUND OF THE INVENTION

The present invention generally relates to a diffusion barrier coating for a Si-based substrate. The present invention also relates to an apparatus comprising a Si-based substrate and a diffusion barrier coating on the Si-based substrate.

Silicon-based materials, such as silicon nitride ($Si_3N_4$), silicon carbide (SiC), molybdenum silicides, niobium silicides, and their composites have been developed for ultra-high temperature gas turbine engine hot section components, such as blades, nozzles, and combustors. Such materials have superior high temperature performance, as compared with Ni-based superalloys. However, in the gas turbine environment, such silicon-based materials are prone to excessive oxidation to form a silica layer, and the subsequent rapid loss of the silica layer. Excessive oxidation of the substrate results from the infiltration of substrate constituents, coating constituents, or environmental contaminants, into the silica layer. In particular, when cationic impurities having a valance <+4 are incorporated into the silica layer, the network of the silica glass is broken down, and the oxygen diffusion rate of the silica layer is greatly increased, thereby promoting further oxidation of the substrate. This in turns leads to increased loss of silica due to the reaction of the silica layer with water vapor in the environment to form volatile or gaseous SiO and $Si(OH)_x$ species. The combination of excessive oxidation of silicon-based components and loss of the resulting silica layer leads to recession of the components, reduced load-bearing capability, and shortened lifetime.

Attempts have been made to inhibit oxidation of silicon-based components by applying an environmental barrier coating to prevent direct exposure of the substrate to oxygen and water vapor in the gas turbine engine environment. However, a silica layer still inevitably forms at the interface between the substrate and the environmental barrier coating, and the reaction of the silica layer at the substrate-environmental barrier coating interface with constituents of the environmental barrier coating degrades the protective property of the silica layer. Similarly, the silica layer may be degraded by reaction with constituents of the substrate with which it is in contact. Further, silica layers of the prior art which are in direct contact with Si-based substrates continue to grow in thickness until through-thickness cracks develop, which may lead to spallation of an entire environmental barrier coating.

U.S. Pat. No. 6,071,622 to Beesabathina, et al. discloses a stabilized two-phase glass diffusion barrier for a superalloy substrate. The barrier comprises a base layer that may be formed from an alumina or borosilicate solgel, a two-phase glass diffusion barrier layer on the base layer, and a two-phase glass sealant layer on the diffusion barrier layer.

U.S. Pat. No. 6,312,763 B1 to Eaton, Jr., et al. discloses a silicon-based substrate with an environmental/thermal barrier layer comprising a bond layer of silica or silicon metal on the substrate, an intermediate layer on the bond layer, and a barrier layer on the intermediate layer. The intermediate layer comprises a material such as silica, mullite, an aluminosilicate, an yttrium silicate, or silicon metal; while the barrier layer comprises predominantly $Y_2O_3$, balance $SiO_2$.

Possible disadvantages of the '763 patent include the following. Silicon metal undergoes softening at the temperatures experienced during service. Further, such a coating is susceptible to degradation following diffusion of substrate constituents into the coating. In particular, the silicon metal and silica of the bond layer, being in direct contact with the Si-based substrate, can react with constituents of the substrate at temperatures experienced during service to form a low-viscosity silicate glass that is not an effective barrier to diffusion of oxygen into the substrate, whereby the substrate is not protected from oxidative damage.

U.S. patent application Publication No. 2003/0003328 A1 discloses a coating for a non-metallic substrate, wherein the coating comprises a silica layer on the substrate, a layer of mullite (or mullite plus barium strontium aluminosilicate (BSAS)) on the silica layer, a layer of an alkaline earth aluminosilicate on the layer of mullite or mullite plus BSAS, and a thermal barrier coating comprising yttria stabilized zirconia on the layer of alkaline earth aluminosilicate. As described hereinabove, the silica layer of such a coating, being in direct contact with the substrate, is susceptible to degradation following diffusion of substrate constituents into the silica layer.

Thus, while various environmental barrier coating systems have been applied to Si-based nonmetallic components in an attempt to decrease oxidation of the substrate and to reduce the rate of recession, there remains the problem of excessive oxidation of Si-based nonmetallic components due to exposure of the silica layer to constituents of the environmental barrier coating and to constituents of the substrate during service conditions.

As can be seen, there is a need for a diffusion barrier coating that can protect a Si-based substrate from oxidative damage during gas turbine engine service conditions (e.g., thermal cycling to temperatures of 1200 to 1350° C.). There is an additional need for a diffusion barrier coating for a Si-based substrate, wherein the diffusion barrier coating includes a first isolation layer, disposed between the Si-based substrate and an oxygen barrier layer, to isolate the oxygen barrier layer from the Si-based substrate. There is also a need for a component comprising a diffusion barrier coating on a Si-based substrate, and an environmental barrier coating disposed on the diffusion barrier coating, wherein the diffusion barrier coating includes a second isolation layer disposed between the environmental barrier coating and the oxygen barrier layer to isolate the oxygen barrier layer from the environmental barrier coating.

The present invention provides such coatings and components, as will be described in enabling detail hereinbelow.

SUMMARY OF THE INVENTION

In one aspect of the present invention, there is provided a component including a silicon-based substrate and a diffusion barrier coating disposed on the substrate. The diffusion barrier coating comprises a first isolation layer disposed on the silicon-based substrate, a first oxygen barrier layer disposed on the first isolation layer, and a second isolation layer disposed on the first oxygen barrier layer. The first oxygen barrier layer comprises a $SiO_2$-based material, and the first isolation layer and the second isolation layer each comprise a material such as $Ta_2O_5$, $Ta_5Si_3$, $TaSi_2$, $MoSi_2$, $Mo_5Si_3$, $Si_3N_4$, $Si_2N_2O$, or SiC.

In another aspect of the present invention, there is provided a component comprising a silicon-based substrate, and a diffusion barrier coating disposed on the substrate. The diffusion barrier coating may comprise a first isolation layer disposed on the silicon-based substrate, a first oxygen barrier layer disposed on the first isolation layer, a second isolation layer disposed on the first oxygen barrier layer, and an environmental barrier coating disposed on the diffusion barrier coating. The first oxygen barrier layer provides a barrier to the diffusion of oxygen therethrough, and each of the first isolation layer and the second isolation layer comprises a material such as $Ta_2O_5$, $Ta_5Si_3$, $TaSi_2$, $MoSi_2$, $Mo_5Si_3$, $Si_3N_4$, $Si_2N_2O$, or SiC.

In still another aspect of the present invention, there is provided a component comprising a silicon-based substrate, a first isolation layer disposed on the silicon-based substrate, a first oxygen barrier layer disposed on the first isolation layer, and a second isolation layer disposed on the first oxygen barrier layer. The first isolation layer comprises a material such as $Ta_2O_5$, $Ta_5Si_3$, $TaSi_2$, $MoSi_2$, $Mo_5Si_3$, $Si_3N_4$, $Si_2N_2O$, or SiC. The first oxygen barrier layer comprises a material such as a silicate glass or crystalline silica. The second isolation layer comprises a material such as $Ta_2O_5$, $Ta_5Si_3$, $TaSi_2$, $MoSi_2$, $Mo_5Si_3$, $Si_3N_4$, $Si_2N_2O$, or SiC. The first oxygen barrier layer has a thickness in the range of from about 1 to 20 microns, and the first and second isolation layers each have a thickness in the range of from about 1 to 100 microns.

In yet another aspect of the present invention, there is provided a component comprising a silicon-based substrate and a diffusion barrier coating disposed on the substrate. The diffusion barrier coating comprises a plurality of isolation layers, and one or more oxygen barrier layers. At least one of the plurality of isolation layers is disposed on the silicon-based substrate, and each of the one or more oxygen barrier layers is disposed between two of the plurality of isolation layers. Each of the one or more oxygen barrier layers comprises a $SiO_2$-based material, and each of the plurality of isolation layers comprises a material such as $Ta_2O_5$, $Ta_5Si_3$, $TaSi_2$, $MoSi_2$, $Mo_5Si_3$, $Si_3N_4$, $Si_2N_2O$, and SiC.

In a further aspect of the present invention, there is provided a component comprising a silicon-based substrate, and a diffusion barrier coating disposed on the substrate. The diffusion barrier coating includes a first isolation layer disposed on the silicon-based substrate, a first oxygen barrier layer disposed on the first isolation layer, a second isolation layer disposed on the first oxygen barrier layer, and an environmental barrier coating disposed on the second isolation layer. The first oxygen barrier layer serves as a barrier to the diffusion of oxygen therethrough. The first isolation layer is inert to the silicon-based substrate, and the second isolation layer is inert to the environmental barrier coating.

In an additional aspect of the present invention, there is provided a diffusion barrier coating for a silicon-based substrate, wherein the diffusion barrier coating comprises a first isolation layer, a first oxygen barrier layer disposed on the first isolation layer; and a second isolation layer disposed on the first oxygen barrier layer. The first oxygen barrier layer comprises a $SiO_2$-based material, and each of the first isolation layer and the second isolation layer comprises a material such as $Ta_2O_5$, $Ta_5Si_3$, $TaSi_2$, $MoSi_2$, $Mo_5Si_3$, $Si_3N_4$, $Si_2N_2O$, or SiC.

In yet another aspect of the present invention, there is provided a component comprising a silicon-based substrate, and a diffusion barrier coating disposed on the substrate. The diffusion barrier coating includes an isolation layer disposed on the silicon-based substrate, a first oxygen barrier layer disposed on the isolation layer, and a second oxygen barrier layer disposed on the first oxygen barrier layer. The first oxygen barrier layer and the second oxygen barrier layer provide a barrier to the diffusion of oxygen therethrough.

In another aspect of the present invention, there is provided a method for making a component, the method comprising: providing a silicon-based substrate, forming a first isolation layer on the silicon-based substrate, forming a first oxygen barrier layer on the first isolation layer, and forming a second isolation layer on the first oxygen barrier layer. The first isolation layer isolates the oxygen barrier layer from the silicon-based substrate, and the first isolation layer is inert to the silicon-based substrate.

In another aspect of the present invention, there is provided a method for making a component, the method comprising: providing a silicon-based substrate, forming a first isolation layer on the silicon-based substrate, forming a first oxygen barrier layer on the first isolation layer, forming a second isolation layer on the first oxygen barrier layer, and forming an environmental barrier coating on the second isolation layer. The first oxygen barrier layer comprises silicate glass. The first isolation layer and the second isolation layer each comprise a material such as $Ta_2O_5$, TaSi, $TaSi_2$, $MoSi_2$, $Mo_5Si_3$, $Si_3N_4$, $Si_2N_2O$, or SiC.

In another aspect of the present invention, there is provided a method for making a component, the method comprising: providing a silicon-based substrate, forming a first isolation layer on the silicon-based substrate, and forming a second isolation layer on the first isolation layer, wherein the first isolation layer consists essentially of $Si_3N_4$ and the second isolation layer consists essentially of $Ta_2O_5$.

In yet another aspect of the present invention, there is provided a method for making a component, the method including providing a silicon-based substrate, forming an isolation layer on the silicon-based substrate, forming a first oxygen barrier layer on the isolation layer, and forming a second oxygen barrier layer on the first oxygen barrier layer. The isolation layer isolates the first oxygen barrier layer from the silicon-based substrate, and the isolation layer is inert to the silicon-based substrate.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a component, such as for a gas turbine engine, with the component comprising a Si-based substrate having a multi-layered coating thereon. The multi-layered coating may have a diffusion barrier coating disposed on the Si-based substrate, an environmental barrier coating on the diffusion barrier coating, and optionally a thermal barrier coating on the environmental barrier coating. The component may be, for example, a nozzle, a blade, or a combustor. The substrate may be, for example, a silicon carbide- or silicon nitride-based ceramic. The diffusion barrier coating may comprise at least a first isolation layer on the substrate and at least a first oxygen barrier layer on the first isolation layer. The diffusion barrier coating may further comprise a second isolation layer on the first oxygen barrier layer. Alternatively, the diffusion barrier coating may further comprise a second oxygen barrier layer disposed directly on the first oxygen barrier layer.

The oxygen barrier layer(s) may each comprise a material such as silica, e.g., in the form of silicate glass or crystalline silica, or a silicate, and the like. Each of the first isolation layer and the second isolation layer may comprise a material such as $Ta_2O_5$, $Ta_5Si_3$, $TaSi_2$, $MoSi_2$, $Mo_5Si_3$, $Si_3N_4$, $Si_2N_2O$, or SiC. The diffusion barrier coating may protect the Si-based substrate from oxidation at a temperature of about 1500° C.

The present invention, in contrast to the prior art which may use a silica layer as a diffusion barrier as described below, provides a diffusion barrier coating for a Si-based substrate, wherein the diffusion barrier coating includes an oxygen barrier layer which prevents the diffusion of oxygen into the substrate, in combination with a first isolation layer which shields the oxygen barrier layer from constituents of the substrate. The diffusion barrier coating may further include at least one additional layer disposed on the oxygen barrier layer, e.g., a second isolation layer, which shields the oxygen barrier layer from constituents of coating(s) disposed on the diffusion barrier coating. In this manner, the integrity of the oxygen barrier layer is maintained, and the substrate is thereby protected by the oxygen barrier layer from oxidative damage during service conditions.

Figure 1A:
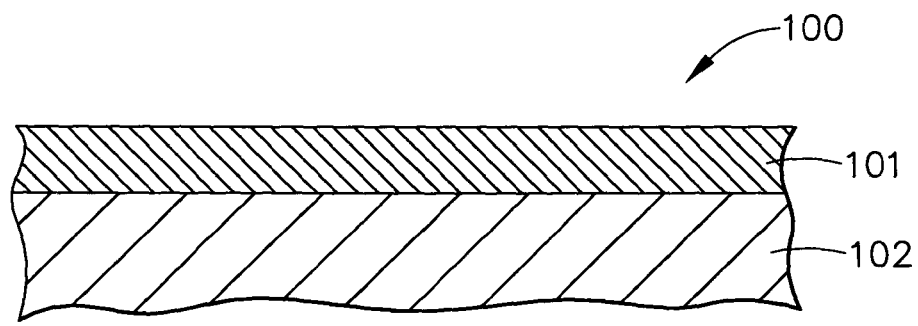
FIG. 1A schematically represents a sectional view of a silicon-based component having a silica layer thereon, according to the prior art.

With reference to the drawings, FIG. 1A schematically represents a sectional view of a silicon-based component 100 having a silicon-based substrate 102 and a silica layer 101 thereon, according to the prior art. Although silica layer 101, when pure (i.e., pure $SiO_2$), may form an effective barrier to the diffusion of oxygen into substrate 102, silica layer 101 is directly exposed to impurities from the environment and to constituents of substrate 102. Consequently, under oxidizing conditions, silica layer 101 increases in thickness and undergoes a decrease in viscosity. As a result, the effectiveness of silica layer 101 as a barrier to the diffusion of oxygen into substrate 102 is decreased, and silica layer 101 tends to crack and spall.

Figure 1B:
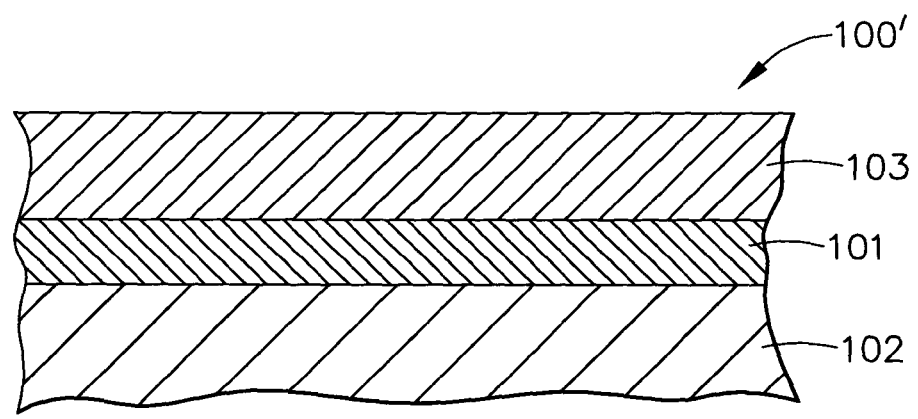
FIG. 1B schematically represents a sectional view of a coated silicon-based component, also according to the prior art.

FIG. 1B schematically represents a sectional view of a prior art silicon-based component 100' having a silicon-based substrate 102 and a silica layer 101 thereon. Prior art component 100' includes an environmental barrier coating 103 disposed on silica layer 101. (Silica layer 101 may be grown from the substrate during service in an oxidizing environment, or may be formed by a deposition process during the manufacturing of the substrate.) Deposition of environmental barrier coating 103 is an attempt to protect substrate 102 from the environment. However, silica layer 101 of component 100' is directly exposed to constituents of environmental barrier coating 103 as well as to constituents of substrate 102, and silica layer 101 may react with such constituents and thereby lose its oxidation protection capability.

Figure 2:
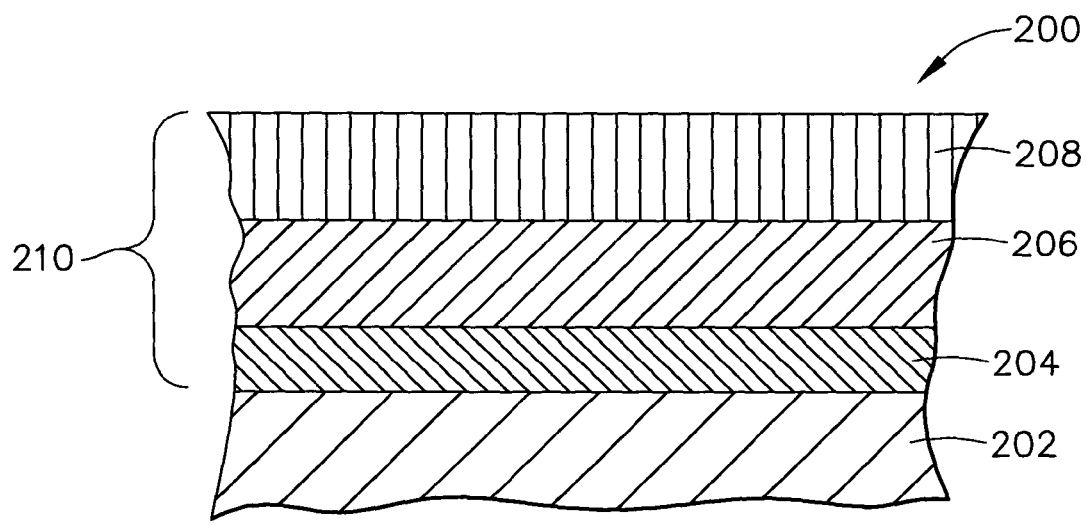
FIG. 2 schematically represents a sectional view of a component having a multi-layered coating, including a diffusion barrier coating on a silicon-based substrate, according to one aspect of the invention.

FIG. 2 schematically represents a sectional view of a silicon-based component 200, according to one aspect of the invention. Component 200 may have a multi-layered coating 210 thereon. Multi-layered coating 210 may include a diffusion barrier coating 204 disposed directly on a silicon-based substrate 202. Component 200 may further include an environmental barrier coating 206 directly disposed on diffusion barrier coating 204. In some embodiments, component 200 may still further include a thermal barrier coating 208 directly disposed on environmental barrier coating 206.

Diffusion barrier coating 204 is described fully hereinbelow, e.g., with reference to FIGS. 3A-B and 4A-B. Environmental barrier coating 206 may serve as a barrier to prevent the ingress of environmental particulate or corrosive materials into diffusion barrier coating 204, whereby contact between such materials and diffusion barrier coating 204 is precluded, or decreased (as compared with the level of contact that would exist between such materials and diffusion barrier coating 204 in the absence of environmental barrier coating 206). Environmental barrier 206 may also serve as a barrier to prevent the loss of silica from diffusion barrier coating 204 by inhibiting the outward diffusion of gaseous reactant products generated from the reaction of silica and water vapor. Environmental barrier coating 206 may comprise, for example, $Ta_2O_5$ or $AlTaO_4$. In some embodiments, environmental barrier coating 206 may comprise at least about 50 mole % $AlTaO_4$, and the balance may comprise at least one oxide of an element selected from the group consisting of Ta, Al, Cr, Hf, Ti, Zr, Mo, Nb, Ni, Sr, Mg, Si, and the rare earth elements including Sc, Y, and the lanthanide series of elements. Environmental barrier coating 206 may have a coefficient of thermal expansion (CTE) in the range of from about 3 to $5 \times 10^{-6\circ}$ $C.^{-1}$, and usually about 3.5 to $5 \times 10^{-6\circ}$ $C.^{-1}$. Environmental barrier coating 206 may have a thickness in the range of from about 0.1 to 50 mils. An environmental and thermal barrier coating for a Si-based component was described in commonly assigned, co-pending U.S. patent application Ser. No. 10/621,719, filed: Jul. 16, 2003, the disclosure of which is incorporated by reference herein in its entirety.

Thermal barrier coating 208, when present, may serve as a barrier to heat, as well as to prevent or inhibit the ingress of particulates or corrosive materials into environmental barrier coating 206, thereby protecting environmental barrier coating 206, diffusion barrier coating 204, and substrate 202 from heat and corrosive materials. As an example, thermal barrier coating 208 may comprise $Ta_2O_5$ or $AlTaO_4$ or mixtures thereof. As another example, thermal barrier coating 208 may comprise a columnar ceramic layer including yttria stabilized zirconia or yttria stabilized hafnia. Thermal barrier coating 208 may have a thickness in the range of from about 10 to 60 mils. A thermal barrier coating for a component was described in commonly assigned, co-pending U.S. patent application Ser. No. 10/621,719, filed: Jul. 16, 2003, the disclosure of which is incorporated by reference herein in its entirety.

Figure 3A:
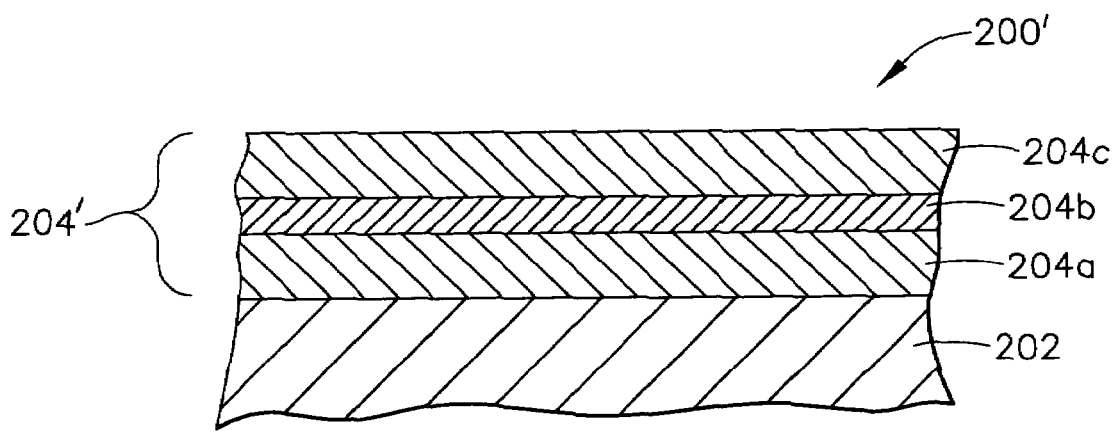
FIG. 3A schematically represents a sectional view of a component having a multi-layered diffusion barrier coating on a silicon-based substrate, according to one embodiment of the invention.

FIG. 3A schematically represents a sectional view of a silicon-based component 200', according to one embodiment of the invention. Component 200' may include a multi-layered diffusion barrier coating 204' on a silicon-based substrate 202. Component 200' may be a gas turbine engine component, e.g., a nozzle, a combustor, or a blade. Silicon-based substrate 202 may comprise a silicon nitride- or a silicon carbide-based ceramic.

Diffusion barrier coating 204' may include a first isolation layer 204a disposed on silicon-based substrate 202. Typically, first isolation layer 204a is inert to silicon-based substrate 202. First isolation layer 204a is typically capable of preventing or inhibiting the diffusion of constituents of silicon-based substrate 202 therethrough. Typically, first isolation layer 204a comprises a material having cations of valence equal to or greater than +4. As an example, first isolation layer 204a may comprise a material such as $Ta_2O_5$, $Ta_5Si_3$, $TaSi_2$, $MoSi_2$, $Mo_5Si_3$, $Si_3N_4$, $Si_2N_2O$, or SiC, and mixtures thereof.

First isolation layer 204a may be deposited by a process such as plasma spray coating, dip coating, sol-gel coating, chemical vapor deposition (CVD), physical vapor deposition (PVD), or electron beam physical vapor deposition (EBPVD). Such deposition processes are generally well known in the art. First isolation layer 204a may be deposited to a thickness in the range of from about 0.1 to 100 microns, usually about 0.2 to 95 microns, and often about 0.2 to 50 microns.

Diffusion barrier coating 204' may further include an oxygen barrier layer 204b directly disposed on first isolation layer 204a. Oxygen barrier layer 204b comprises a material which is an effective barrier to the diffusion of oxygen therethrough. As a result, silicon-based substrate 202 is protected, by oxygen barrier layer 204b, from oxygen in the environment. Consequently, oxygen barrier layer 204b does not undergo oxygen induced changes in thickness and viscosity, both of which may be detrimental to preserving the integrity of silicon-based substrate 202 and any coatings thereon (e.g., environmental barrier coating 206 and thermal barrier coating 208, FIG. 2). Oxygen barrier layer 204b may comprise a material such as silica, which may be in the form of pure silicate glass, or crystalline silica.

Advantageously, because oxygen barrier layer 204b is isolated from substrate 202 by first isolation layer 204a, oxygen barrier layer 204b does not grow in thickness. This is in contrast to the prior art in which silica layers in direct contact with Si-based substrates typically continue to grow in thickness until through-thickness cracks develop; such cracks may lead to spallation of an entire prior art environmental barrier coating during service.

In some embodiments, oxygen barrier layer 204b may comprise a silica composite comprising a particulate or whisker component such as $Ta_2O_5$, $MoSi_2$, SiC, $Si_3N_4$, and crystalline silicates of rare earth elements including Sc, Y, and the lanthanide series. In this manner, the coefficient of thermal expansion (CTE) of oxygen barrier layer 204b may be increased to more closely match the CTE of substrate 202, environmental barrier coating 206, first isolation layer 204a, and/or second isolation layer 204c. The CTE of oxygen barrier layer 204b may be in the range of from about 1 to $5 \times 10^{-6 \circ}$ $C.^{-1}$, usually 1.5 to $5 \times 10^{-6 \circ}$ $C.^{-1}$, and often about 1.5 to $4.5 \times 10^{-6 \circ}$ $C.^{-1}$.

Oxygen barrier layer 204b may be deposited by a process such as plasma spray coating, dip coating, sol-gel coating, chemical vapor deposition, physical vapor deposition, or electron beam physical vapor deposition. Oxygen barrier layer 204b may be deposited to a thickness in the range of from about from about 1 to 50 microns, usually about 1 to 25 microns, and often about 1 to 20 microns.

Diffusion barrier coating 204' may still further include a second isolation layer 204c disposed directly on oxygen barrier layer 204b. Second isolation layer 204c may comprise a material such as $Ta_2O_5$, $Ta_5Si_3$, $TaSi_2$, $MoSi_2$, $Mo_5Si_3$, $Si_3N_4$, $Si_2N_2O$, or SiC. First and second isolation layers 204a, 204c, respectively, may have the same or a similar composition. Typically, the CTE of first and second isolation layers 204a, 204c, respectively, may be in the range of from about 2 to $5 \times 10^{-6 \circ}$ $C.^{-1}$, usually about 3 to $5 \times 10^{-6 \circ}$ $C.^{-1}$, and often about 3 to $4.5 \times 10^{-6 \circ}$ $C.^{-1}$. Second isolation layer 204c may be deposited by a process such as described hereinabove for first isolation layer 204a. Second isolation layer 204c may be deposited to a thickness in the range of from about 0.1 to 100 microns, usually about 0.2 to 95 microns, and often about 0.2 to 50 microns.

Second isolation layer 204c can be capable of preventing or inhibiting the diffusion therethrough of constituents of a coating, e.g., environmental barrier coating 206 (FIG. 2), disposed above second isolation layer 204c. Typically, second isolation layer 204c is inert to environmental barrier coating 206 (FIG. 2). Second isolation layer 204c can be further capable of preventing or inhibiting the diffusion of contaminants, e.g., from the environment of component 200', into oxygen barrier layer 204b.

According to another embodiment, first isolation layer 204a may comprise pure $Si_3N_4$, e.g., formed via chemical vapor deposition (CVD), or may consist essentially of $Si_3N_4$; second isolation layer 204c may comprise $Ta_2O_5$; and oxygen barrier layer 204b may grow in situ as pure silica during service.

Figure 3B:
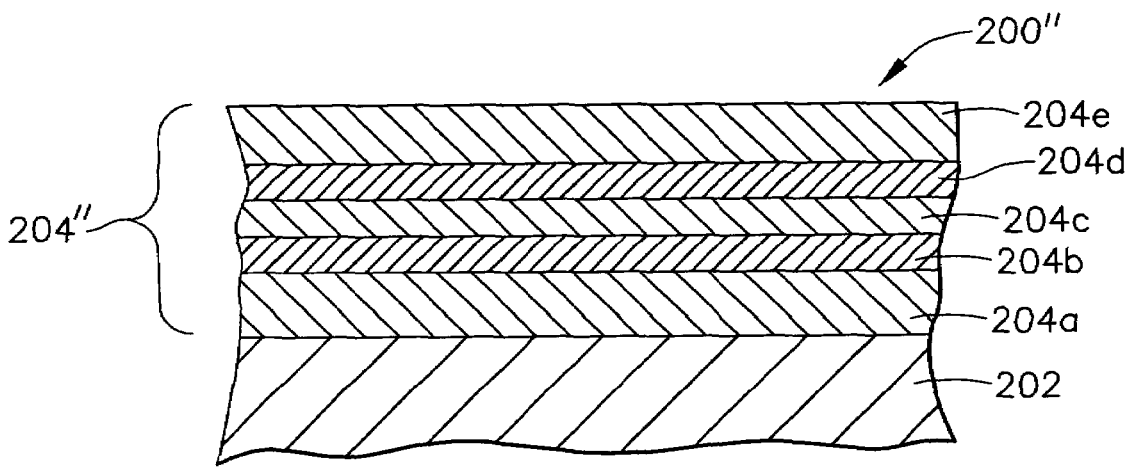
FIG. 3B schematically represents a sectional view of a component having a multi-layered diffusion barrier coating on a silicon-based substrate, according to another embodiment of the invention.

FIG. 3B schematically represents a sectional view of a silicon-based component 200" having a multi-layered diffusion barrier coating 204" on a silicon-based substrate 202, according to another embodiment of the invention. Component 200" and diffusion barrier coating 204" may have the same or similar elements, features, and characteristics as described for component 200' and diffusion barrier coating 204' (FIG. 3A). In addition, diffusion barrier coating 204" may further include a second oxygen barrier layer 204d disposed on second isolation layer 204c, and a third isolation layer 204e disposed on second oxygen barrier layer 204d.

Furthermore, diffusion barrier coatings of the invention are not limited to the number of layers shown in FIGS. 3A-B, but instead diffusion barrier coatings of the invention may have a greater number of oxygen barrier layers and isolation layers, i.e., more than a total of five layers. In some embodiments of the invention, diffusion barrier coatings may have a plurality of isolation layers which alternate with at least one oxygen barrier layer, wherein the first and last layers are isolation layers, such that when the number of oxygen barrier layers is n, the number of isolation layers is (n+1). Typically, n may be an integer from 1-10, usually from 1-5, and often from 1-3.

Again with reference to FIG. 3B, the composition, thickness, deposition process, and function of second oxygen barrier layer 204$d$, or any subsequent oxygen barrier layer, may be essentially as described for first oxygen barrier layer 204$b$. Similarly, the composition, thickness, deposition process, and function of third isolation layer 204$e$, or any subsequent isolation layer, may be essentially as described for first and second isolation layers 204$a$, 204$c$, respectively. Alternatively, first, second, and third isolation layers 204$a$, 204$c$, and 204$e$, respectively, may vary in composition, CTE, or thickness. Similarly, first and second oxygen barrier layers 204$b$, 204$d$, respectively, may vary in composition and CTE, e.g., to improve the CTE match with substrate 202 or environmental barrier coating 206.

Figure 3C:
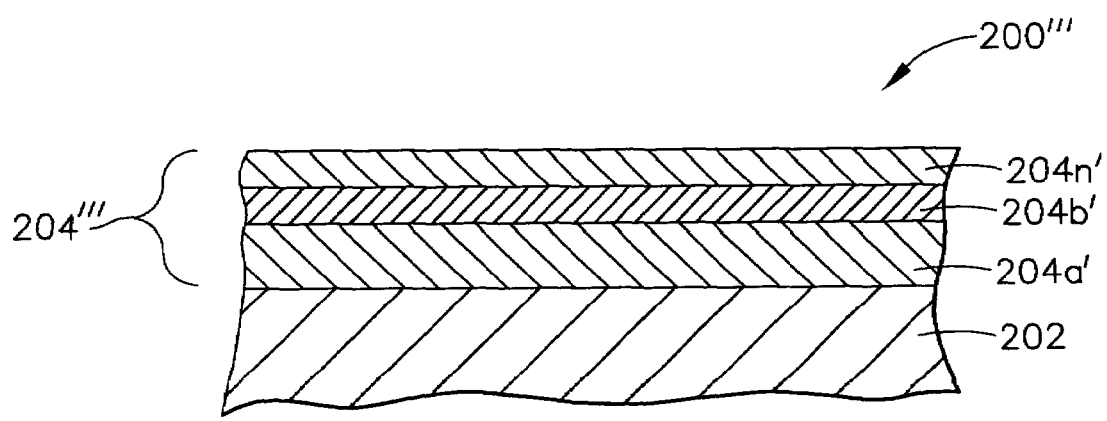
FIG. 3C schematically represents a sectional view of a component having a multi-layered diffusion barrier coating on a silicon-based substrate, according to another embodiment of the invention.

FIG. 3C schematically represents a sectional view of a component 200''' having a multi-layered diffusion barrier coating 204''' on a silicon-based substrate 202, according to another embodiment of the invention. Diffusion barrier coating 204''' may include an isolation layer 204$a$' disposed directly on silicon-based substrate 202. Isolation layer 204$a$' may have features and characteristics as described hereinabove for first isolation layer 204$a$ (FIGS. 3A-B). For example, isolation layer 204$a$' may be inert to silicon-based substrate 202, and can be capable of preventing or inhibiting the diffusion of constituents of silicon-based substrate 202 therethrough. Isolation layer 204$a$' may comprise a material such as $Ta_2O_5$, $Ta_5Si_3$, $TaSi_2$, $MoSi_2$, $Mo_5Si_3$, $Si_3N_4$, $Si_2N_2O$, or SiC, or mixtures thereof.

Diffusion barrier coating 204''' may further include a plurality of oxygen barrier layers disposed on isolation layer 204$a$. Such a plurality of oxygen barrier layers are represented in FIG. 3C as a first oxygen barrier layer 204$b$' disposed on isolation layer 204$a$, and a second oxygen barrier layer 204$n$' disposed on first oxygen barrier layer 204$b$'. Each of first and second oxygen barrier layers 204$b$', 204$n$' may have features and characteristics as described hereinabove for oxygen barrier layer 204$b$ (FIG. 3A). For example, first and second oxygen barrier layers 204$b$', 204$n$' may each comprise a material which is an effective barrier to the diffusion of oxygen therethrough. Consequently, silicon-based substrate 202 is protected by first and second oxygen barrier layers 204$b$', 204$n$' from oxygen in the environment.

Each of first and second oxygen barrier layers 204$b$', 204$n$' may be comprised of materials described hereinabove for oxygen barrier layer 204$b$ (FIG. 3A). For example, first and second oxygen barrier layers 204$b$', 204$n$' may each be comprised of a material such as pure silicate glass, crystalline silica, or a silica composite comprising a particulate or whisker component such as $Ta_2O_5$, $MoSi_2$, SiC, $Si_3N_4$, and crystalline silicates of rare earth elements including Sc, Y, and the lanthanide series. Alternatively, one or more of first and second oxygen barrier layers 204$b$', 204$n$' may comprise a silicate, such as scandium silicate ($ScSiO_5$) or scandium disilicate ($Sc_2Si_2O_7$).

As described hereinabove for diffusion barrier coating 204' (FIG. 3A), the composition of first and second oxygen barrier layers 204$b$', 204$n$' may be adjusted to provide a coefficient of thermal expansion (CTE) for first and second oxygen barrier layers 204$b$', 204$n$' that more closely matches the CTE of substrate 202, environmental barrier coating 206 (FIG. 2), or isolation layer 204$a$'. As an example, the CTE of first and second oxygen barrier layers 204$b$', 204$n$' may be in the range of from about 1 to $5 \times 10^{-6}$ °C.$^{-1}$, usually about 1.5 to $5 \times 10^{-6}$ °C.$^{-1}$, and often about 1.5 to $4.5 \times 10^{-6}$ °C.$^{-1}$. Although, two oxygen barrier layers are shown in FIG. 3C, it is to be understood that larger numbers of such oxygen barrier layers are also contemplated and are within the scope of the invention.

Figure 4A:
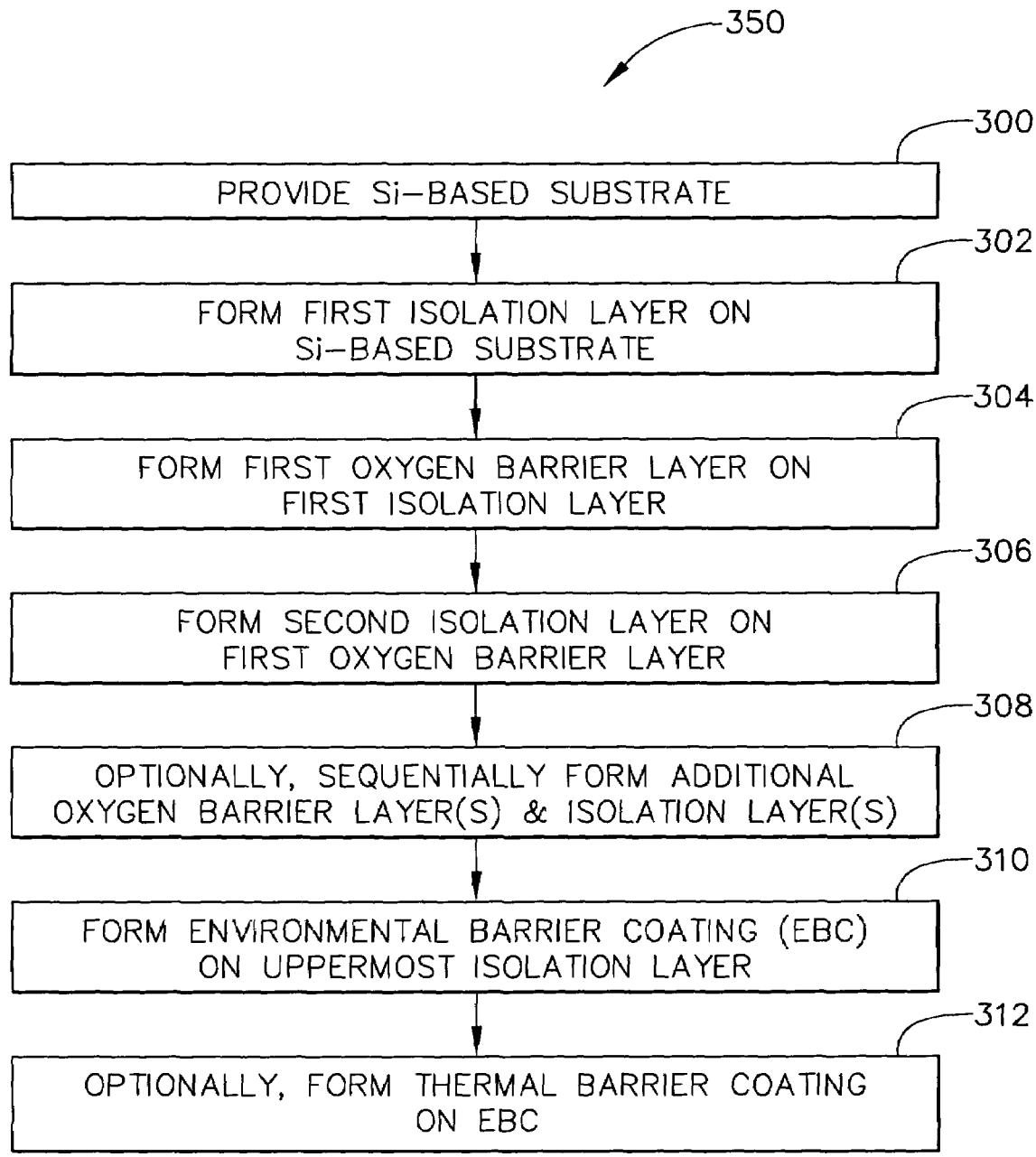
FIG. 4A schematically represents a series of steps involved in a method for making a silicon-based component having a multi-layered diffusion barrier coating, according to another embodiment of the invention.

FIG. 4A schematically represents a series of steps involved in a method 350 for making a silicon-based component having a multi-layered diffusion barrier coating, according to another embodiment of the invention. The silicon-based component may comprise a component for a gas turbine engine, such as a nozzle, a blade, or a combustor.

Step 300 may involve providing a silicon-based substrate. Such a silicon-based substrate may comprise a silicon nitride or silicon carbide containing ceramic. In general, silicon nitride and silicon carbide containing ceramics are well known in the art.

Step 302 may involve forming a first isolation layer on a surface of the silicon-based substrate. The first isolation layer may comprise a material such as $Ta_2O_5$, $Ta_5Si_3$, $TaSi_2$, $MoSi_2$, $Mo_5Si_3$, $Si_3N_4$, $Si_2N_2O$, or SiC. The first isolation layer is adapted for precluding or inhibiting the diffusion of substrate constituents through the first isolation layer. The first isolation layer may be deposited by a range of deposition processes, including plasma spray coating, dip coating, sol-gel coating, chemical vapor deposition, physical vapor deposition, or electron beam physical vapor deposition. Such deposition processes are generally known in the art. The first isolation layer may be deposited to a thickness in the range of typically from about 0.1 to 100 microns, usually about 0.2 to 95 microns, and often about 0.2 to 50 microns.

Step 304 may involve forming a first oxygen barrier layer on the first isolation layer. The first oxygen barrier layer may comprise a material such as silica, which may be in the form of pure silicate glass, or crystalline silica. Alternatively, the oxygen barrier layer may comprise a silica composite comprising a particulate or whisker component such as $Ta_2O_5$, $MoSi_2$, SiC, $Si_3N_4$, or crystalline silicates of rare earth elements including Sc, Y, and the lanthanide series. The first oxygen barrier layer can be adapted for precluding or inhibiting the diffusion of oxygen therethrough, e.g., from the environment into the silicon-based substrate. The first oxygen barrier layer may be deposited by various deposition processes, e.g., as described for step 302. The first oxygen barrier layer may be deposited to a thickness in the range of from about 1 to 50 microns, usually about 1 to 25 microns, and often about 1 to 20 microns.

Step 306 may involve forming a second isolation layer on the first oxygen barrier layer. The second isolation layer may comprise a material such as $Ta_2O_5$, $Ta_5Si_3$, $TaSi_2$, $MoSi_2$, $Mo_5Si_3$, $Si_3N_4$, $Si_2N_2O$, or SiC, as described for the first isolation layer (step 302). The second isolation layer may be adapted for precluding or inhibiting the diffusion of contaminants from the environment into the first oxygen barrier layer. The second isolation layer may be further adapted to preclude or inhibit the diffusion of constituents of any layers above second isolation layer into the first oxygen barrier layer. For example, in some embodiments, an environmental barrier coating may be disposed on the second isolation layer, and the second isolation layer prevents the diffusion of constituents of the environmental barrier coating into the first oxygen barrier layer. The second isolation layer may be deposited by a process, and to a thickness, as described hereinabove with reference to step 302 for deposition of the first isolation layer.

Optional step 308 may involve sequentially forming one or more additional oxygen barrier layers and one or more additional isolation layers. The one or more additional oxygen barrier layers and one or more additional isolation layers may be formed such that the oxygen barrier layer(s) alternate with the isolation layers, whereby each oxygen barrier layer may be interposed (or sandwiched) between two of the isolation layers.

Step 310 may involve forming an environmental barrier coating on the diffusion barrier coating. Typically, the environmental barrier coating may be formed on the uppermost isolation layer of the diffusion barrier coating. The environmental barrier coating may be deposited on the diffusion barrier coating using various deposition techniques well known in the art, e.g., by a process such as plasma spray coating, dip coating, sol-gel coating, chemical vapor deposition, physical vapor deposition, or electron beam physical vapor deposition.

The environmental barrier coating formed in step 310 may have the features, elements, or characteristics described hereinabove, e.g., with reference to FIG. 2. For example, the environmental barrier coating may comprise at least about 50 mole % AlTaO$_4$, and the balance may comprise at least one oxide of an element selected from the group consisting of Ta, Al, Cr, Hf, Ti, Zr, Mo, Nb, Ni, Sr, Mg, Si, and the rare earth elements including Sc, Y, and the lanthanide series of elements. The environmental barrier coating may be deposited to a thickness in the range of from about 0.1 to 50 mils.

After step 310, optional step 312 may involve forming a thermal barrier coating on the environmental barrier coating formed in step 310. As an example, the thermal barrier coating formed in step 312 may have the features, elements, or characteristics described hereinabove for thermal barrier coating 208 (FIG. 2).

Figure 4B:
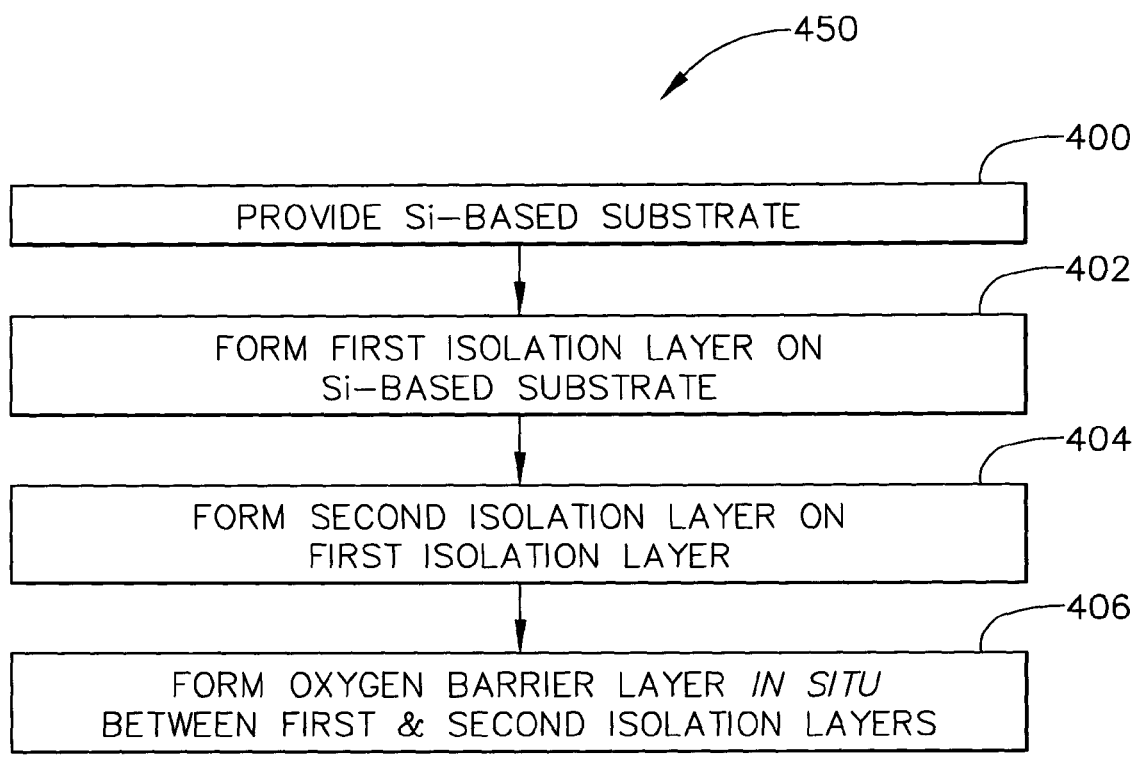
FIG. 4B schematically represents a series of steps involved in a method for making a silicon-based component having a multi-layered diffusion barrier coating, according to another embodiment of the invention.

FIG. 4B schematically represents a series of steps involved in a method 450 for making a silicon-based component having a multi-layered diffusion barrier coating, according to another embodiment of the invention.

Step 400 may involve providing a silicon-based substrate, e.g., essentially as described for step 300 (FIG. 4A). Step 402 may involve forming a first isolation layer on a surface of the silicon-based substrate, wherein the first isolation layer may comprise pure silicon nitride, or may consist essentially of silicon nitride.

Step 404 may involve forming a second isolation layer on the first isolation layer, wherein the second isolation layer may comprise Ta$_2$O$_5$. During exposure of the coated silicon-based component to service conditions, a layer of pure silica may be formed in situ between the first isolation layer and the second isolation layer by the oxidation of the pure silicon nitride of the first isolation layer (step 406). Such a layer of pure silica provides an oxygen barrier layer which is an effective barrier against the diffusion of oxygen into the underlying silicon-based substrate.

Figure 4C:
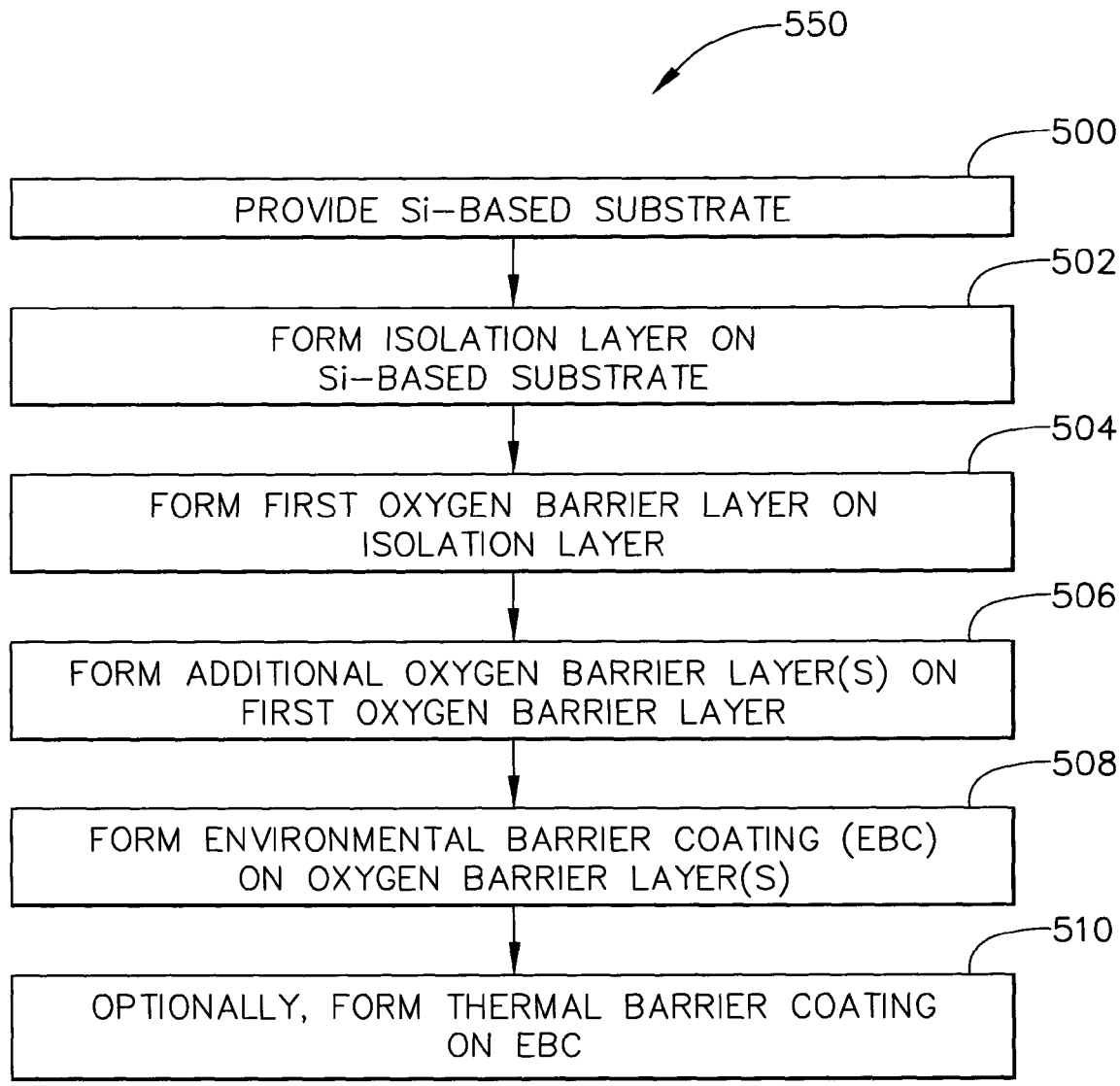
FIG. 4C schematically represents a series of steps involved in a method for making a silicon-based component having a multi-layered diffusion barrier coating, according to another embodiment of the invention.

FIG. 4C schematically represents a series of steps involved in a method 550 for making a silicon-based component having a multi-layered diffusion barrier coating, according to another embodiment of the invention. The silicon-based component may comprise a component for a gas turbine engine, such as a nozzle, a blade, or a combustor.

Step 500 may involve providing a silicon-based substrate, e.g., essentially as described for step 300 (FIG. 4A). Step 502 may involve forming an isolation layer on a surface of the silicon-based substrate, e.g., essentially as described for step 302 (FIG. 4A).

Step 504 may involve forming a first oxygen barrier layer on the isolation layer. Thereafter, step 506 may involve forming at least a second oxygen barrier layer on the first oxygen barrier layer. In some embodiments, step 506 may further involve forming one or more additional oxygen barrier layers on the second oxygen barrier layer.

Each oxygen barrier layer formed in steps 504 and 506 may have a composition, as well as other features and characteristics, as described hereinabove for the first oxygen barrier layer formed in step 304 of method 350 (FIG. 4A), or as described for first and second oxygen barrier layers 204b', 204n' (FIG. 3C). Each oxygen barrier layer formed in steps 504 and 506 may be deposited by a deposition process such as plasma spray coating, dip coating, sol-gel coating, chemical vapor deposition, physical vapor deposition, or electron beam physical vapor deposition.

Step 508 may involve forming an environmental barrier coating on the diffusion barrier coating. The environmental barrier coating may be formed on the uppermost oxygen barrier layer of the diffusion barrier coating. The environmental barrier coating may be deposited by a process such as plasma spray coating, dip coating, sol-gel coating, chemical vapor deposition, physical vapor deposition, or electron beam physical vapor deposition. The environmental barrier coating formed in step 508 may have a composition and thickness, as well as various features, elements, and characteristics described hereinabove for environmental barrier coating 206 (FIG. 2).

After step 508, optional step 510 may involve forming a thermal barrier coating on the environmental barrier coating formed in step 508. As an example, the thermal barrier coating formed in step 510 may have the features, elements, or characteristics described hereinabove for thermal barrier coating 208 (FIG. 2).

EXAMPLE

Figure 5:
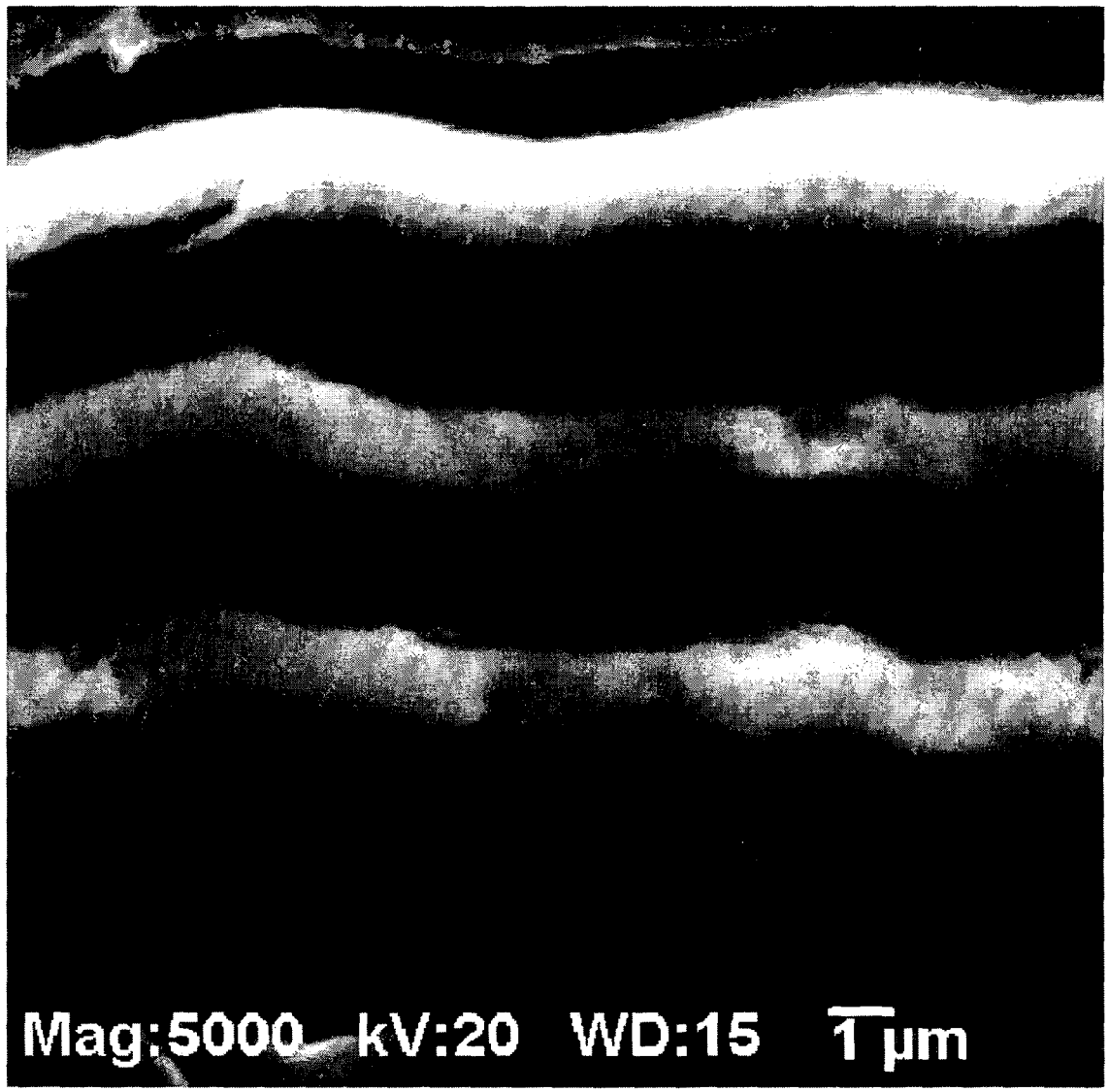
FIG. 5 is a scanning electron micrograph showing a sectional view of a multi-layered diffusion barrier coating, according to the invention.

A sintered monolithic silicon nitride substrate was sequentially coated with i) a first isolation layer of Ta$_2$O$_5$, ii) a first oxygen barrier layer of SiO$_2$, iii) a second isolation layer of Ta$_2$O$_5$, iv) a second oxygen barrier layer of SiO$_2$, and v) a third isolation layer of Ta$_2$O$_5$. Each of the isolation layers was deposited by CVD to a thickness of about 2 microns, and each of the oxygen barrier layers was deposited by CVD to a thickness of about 3 microns. A scanning electron micrograph (5000× magnification) showing a sectional view of a multi-layered diffusion barrier coating prepared according to this Example is shown in FIG. 5.

The oxidation resistance of the coated substrate was tested. After 192 hours in air at a temperature of 1400° C., the weight gain was <0.4 mg.cm$^{-2}$. In comparison, the weight gain for the same silicon nitride substrate without the coating was 0.7 mg.cm$^{-2}$.

It should be understood, of course, that the foregoing relates to embodiments of the invention and that modifications may be made without departing from the spirit and scope of the invention as set forth in the following claims.

We claim:

1. A component, comprising:
   a silicon-based substrate;
   a diffusion barrier coating disposed on said substrate, wherein said diffusion barrier coating comprises:
   a first isolation layer disposed on said silicon-based substrate;
   a first oxygen barrier layer disposed on said first isolation layer; and
   a second isolation layer disposed on said first oxygen barrier layer,
   wherein said first oxygen barrier layer comprises a SiO$_2$-based material,
   wherein said first isolation layer comprises a material selected from the group consisting of Ta$_2$O$_5$, Ta$_5$Si$_3$, TaSi$_2$, MoSi$_2$, Mo$_5$Si$_3$, Si$_3$N$_4$, Si$_2$N$_2$O, and SiC; and wherein said second isolation layer comprises a material selected from the group consisting of $Ta_2O_5$, $Ta_5Si_3$, $TaSi_2$, $MoSi_2$, and $Mo_5Si_3$; and an environmental barrier coating disposed on said diffusion barrier coating.

2. The component of claim 1, further comprising:
a second oxygen barrier layer disposed on said second isolation layer; and
a third isolation layer disposed on said second oxygen barrier layer.

3. The component of claim 1, wherein said environmental barrier coating comprises at least one oxide of an element selected from the group
consisting of Ta, Al, Cr, Hf, Ti, Zr, Mo, Nb, Ni, Sr, Mg, Si, and the rare earth elements including Sc, Y, and the lanthanide series of elements.

4. The component of claim 3, wherein said environmental barrier coating comprises at least about 50 mole % $AlTaO_4$.

5. The component of claim 1, further comprising:
a thermal barrier coating disposed on said environmental barrier coating.

6. The component of claim 1, wherein said first oxygen baffler layer comprises a material selected from the group consisting of a silicate glass and crystalline silica.

7. The component of claim 1, wherein said first oxygen baffler layer comprises silica and at least one oxide of an element selected from the group consisting of Ta, Al, Cr, Hf, Ti, Zr, Mo, Nb, Ni, Sr, Mg, Si, and the rare earth elements including Sc, Y, and the lanthanide series of elements.

8. The component of claim 1, wherein said first isolation layer and said second isolation layer have the same composition.

9. The component of claim 1, wherein:
said first isolation layer consists essentially of silicon nitride;
said second isolation layer consists essentially of $Ta_2O_5$; and
said first oxygen barrier layer is formed in situ by reaction of said silicon nitride with said $Ta_2O_5$.

10. The component of claim 1, wherein said first oxygen baffler layer has a thickness in the range of from about 1 to 20 microns.

11. The component of claim 1, wherein said first and second isolation layers each have a thickness in the range of from about 1 to 100 microns.

12. A component, comprising:
a silicon-based substrate; and
a diffusion barrier coating disposed on said substrate, wherein said diffusion barrier coating comprises:
  a first isolation layer disposed on said silicon-based substrate;
  a first oxygen barrier layer disposed on said first isolation layer;
  a second isolation layer disposed on said first oxygen baffler layer; and
  an environmental barrier coating disposed on said diffusion barrier coating,
  wherein said first oxygen barrier layer provides a baffler to the diffusion of oxygen therethrough,
  wherein said first isolation layer comprises a material selected from the group consisting of $Ta_2O_5$, $Ta_5Si_3$, $TaSi_2$, $MoSi_2$, $Mo_5Si_3$, $Si_3N_4$, $Si_2N_2O$, and SiC; and
  wherein said second isolation layer consists essentially of $Ta_2O_5$.

13. The component of claim 12, further comprising a thermal baffler coating disposed on said environmental barrier coating, and wherein said environmental barrier coating comprises $AlTaO_4$ or $Ta_2O_5$.

14. The component of claim 12, wherein said thermal baffler coating comprises yttria stabilized zirconia or yttria stabilized hafnia.

15. A component, comprising:
a silicon-based substrate;
a diffusion barrier coating disposed on said substrate, wherein said diffusion barrier coating comprises;
  a plurality of isolation layers, at least one of said plurality of isolation layers disposed on said silicon-based substrate; and
  one or more oxygen baffler layers, each of said one or more oxygen barrier layers disposed between two of said plurality of isolation layers; wherein
  each of said one or more oxygen baffler layers comprises a $SiO_2$-based material, and
  at least one of said plurality of isolation layers consists essentially of $Ta_2O_5$; and
an environmental barrier coating disposed on said diffusion barrier coating.

16. The component of claim 15, wherein:
said one or more oxygen barrier layers consist of n oxygen barrier layers, and
said plurality of isolation layers consist of (n+1) isolation layers, wherein n is an integer in the range of from 1 to 5.

17. A component, comprising:
a gas turbine engine element including a silicon-based substrate; and
a diffusion barrier coating disposed on said substrate, wherein said diffusion barrier coating comprises:
  a first isolation layer disposed on said silicon-based substrate;
  a first oxygen barrier layer disposed on said first isolation layer;
  a second isolation layer disposed on said first oxygen baffler layer; and
  an environmental barrier coating disposed on said second isolation layer and comprising at least about 50 mole % $AlTaO_4$, and further comprising at least one oxide of an element selected from the group consisting of Ta, Al, Cr, Hf, Ti, Zr, Mo, Nb, Ni, Sr, Mg, Si, and rare earth elements including lanthanide series elements,
  wherein said first oxygen barrier layer serves as a barrier to the diffusion of oxygen therethrough,
  wherein said first isolation layer is inert to said silicon-based substrate, and
  wherein said second isolation layer is inert to said environmental barrier coating.

18. A component, comprising:
a silicon-based substrate;
a diffusion barrier coating disposed on said substrate, wherein said diffusion barrier coating comprises:
  an isolation layer consisting of $Ta_2O_5$, $Ta_5Si_3$, $TaSi_2$, $MoSi_2$, and $Mo_5Si_3$ disposed on said silicon-based substrate;
  a first oxygen barrier layer disposed on said first isolation layer; and
  a second oxygen barrier layer disposed on said first oxygen baffler layer,
  wherein each of said first oxygen barrier layer and said second oxygen barrier layer comprises silica or a silicate and provides a barrier to the diffusion of oxygen therethrough; and an environmental barrier coating disposed on said diffusion barrier coating, said environmental barrier coating comprising at least about 50 mole % AlTaO$_4$.

19. The component of claim 18, wherein each of said first oxygen barrier layer and said second oxygen barrier layer comprise a material selected from the group consisting of SiO$_2$, ScSiO$_5$, and Sc$_2$Si$_2$O$_7$.

20. The component of claim 18, further comprising:
a thermal barrier coating disposed on said environmental barrier coating.

21. A method for making a component, the method comprising:
   a) providing a silicon-based substrate;
   b) forming a first isolation layer selected from the group consisting Ta$_2$O$_5$, Ta$_5$Si$_3$, TaSi$_2$, MoSi$_2$, and Mo$_5$Si$_3$ on said silicon-based substrate;
   c) forming a first oxygen barrier layer on said first isolation layer;
   d) forming a second isolation layer on said first oxygen baffler layer, the second isolation layer comprising a material selected from the group consisting of Ta$_2$O$_5$, Ta$_5$Si$_3$, TaSi$_2$, MoSi$_2$, and Mo$_5$Si$_3$,
   wherein said first isolation layer isolates said oxygen barrier layer from said silicon-based substrate, and
   wherein said first isolation layer is inert to said silicon-based substrate; and
   e) forming an environmental barrier coating on said second isolation layer,
   wherein said second isolation layer provides a baffler to the diffusion of constituents of said environmental baffler coating into said first oxygen baffler layer.

22. The method of claim 21, wherein said first oxygen barrier layer provides a baffler to the diffusion of oxygen therethrough.

23. The method of claim 21, wherein said first isolation layer provides a barrier to the diffusion of constituents of said silicon-based substrate into said first oxygen barrier layer.

24. The method of claim 21, further comprising:
   f) forming a thermal barrier coating on said environmental barrier coating.

25. The method of claim 21, wherein said first isolation layer, said oxygen barrier layer, and said second isolation layer are deposited via a process selected from the group consisting of plasma spray coating, dip coating, sol-gel coating, chemical vapor deposition, physical vapor deposition, and electron beam physical vapor deposition.

26. The method of claim 21, wherein said step b) and said step d) respectively comprise depositing said first isolation layer and said second isolation layer via chemical vapor deposition.

27. The method of claim 21, further comprising:
   g) sequentially forming at least one additional oxygen barrier layer and at least one additional isolation layer on said second isolation layer.

28. A method for making a component, the method comprising:
   a) providing a silicon-based substrate;
   b) forming a first isolation layer on said silicon-based substrate;
   c) forming a first oxygen barrier layer on said first isolation layer;
   d) forming a second isolation layer on said first oxygen baffler layer; and
   e) forming an environmental barrier coating on said second isolation layer,
   wherein said first oxygen barrier layer comprises silicate glass, and
   wherein said first isolation layer and said second isolation layer each comprise a material selected from the group consisting of Ta$_2$O$_5$, Ta$_5$Si$_3$, TaSi$_2$, MoSi$_2$, and Mo$_5$Si$_3$.

29. The method of claim 28, further comprising:
   f) prior to said step e), forming a second oxygen barrier layer on said second isolation layer; and
   g) prior to said step e), forming a third isolation layer on said second oxygen barrier layer.

30. A method for making a component, the method comprising:
   a) providing a silicon-based substrate;
   b) forming a first isolation layer on said silicon-based substrate, the first isolation layer consisting essentially of Si$_3$N$_4$;
   c) forming a second isolation layer on said first isolation layer, said second isolation layer consisting essentially of Ta2O5; and
   d) reacting the first isolation layer with the second isolation layer to form, in situ, an oxygen barrier layer between said first isolation layer and said second isolation layer.

31. The method of claim 30, wherein said step d) is performed during service conditions of said component.

32. A method for making a component, the method comprising:
   a) providing a silicon-based substrate;
   b) forming an isolation layer on said silicon-based substrate;
   c) forming a first oxygen barrier layer on said isolation layer; and
   d) forming a second oxygen barrier layer on said first oxygen barrier layer,
   wherein said isolation layer isolates said oxygen barrier layer from said silicon-based substrate,
   wherein said isolation layer is inert to said silicon-based substrate, and wherein said isolation layer comprises a material selected from the group consisting of Ta$_2$O$_5$, Ta$_5$Si$_3$, TaSi$_2$, MoSi$_2$, and Mo$_5$Si$_3$, and
   wherein said first and second oxygen baffler layers comprise silica or a silicate.

33. The method of claim 32, wherein said first oxygen barrier layer and said second oxygen baffler layer each comprise a material selected from the group consisting of SiO$_2$, ScSiO$_5$, and Sc$_2$Si$_2$O$_7$.

34. The method of claim 32, wherein said isolation layer provides a barrier to the diffusion of constituents of said silicon-based substrate into said first oxygen barrier layer.

35. The method of claim 32, further comprising:
   e) forming an environmental barrier coating on said second oxygen barrier layer.

36. The method of claim 35, further comprising:
   f) forming a thermal barrier coating on said environmental barrier coating.

37. The method of claim 32, wherein said isolation layer, said first oxygen barrier layer, and said second oxygen baffler layer are deposited via a process selected from the group consisting of plasma spray coating, dip coating, sol-gel coating, chemical vapor deposition, physical vapor deposition, and electron beam physical vapor deposition.

38. The method of claim 32, further comprising:
   g) forming at least one additional oxygen barrier layer on said second oxygen barrier layer.

* * * * *